US008600452B2

(12) United States Patent
Zellner

(10) Patent No.: US 8,600,452 B2
(45) Date of Patent: *Dec. 3, 2013

(54) MOBILE COMMUNICATIONS DEVICE WITH DISTINCTIVE VIBRATION MODES

(75) Inventor: Samuel N. Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 296 days.

This patent is subject to a terminal disclaimer.

(21) Appl. No.: 12/855,740

(22) Filed: Aug. 13, 2010

(65) Prior Publication Data
US 2010/0302003 A1   Dec. 2, 2010

Related U.S. Application Data

(63) Continuation of application No. 11/689,636, filed on Mar. 22, 2007, now Pat. No. 7,801,569.

(51) Int. Cl.
*H04B 1/38* (2006.01)

(52) U.S. Cl.
USPC ............... 455/567; 455/170.1; 455/412.2; 340/7.6

(58) Field of Classification Search
USPC ........... 455/418, 412.2, 420, 567, 566, 170.1, 455/414.1, 556.2, 283, 343, 415, 416, 455/156.1, 157.2, 159.2, 354, 292; 340/7.6, 340/825.44, 825.46, 825.19, 539.11, 340/539.13, 683
See application file for complete search history.

(56) References Cited

U.S. PATENT DOCUMENTS

| | | | | |
|---|---|---|---|---|
| 6,160,489 A | * | 12/2000 | Perry et al. | 340/7.6 |
| 7,084,758 B1 | * | 8/2006 | Cole | 340/539.11 |
| 7,801,569 B1 | * | 9/2010 | Zellner | 455/567 |
| 2002/0160818 A1 | * | 10/2002 | Nelson et al. | 455/566 |
| 2007/0118426 A1 | * | 5/2007 | Barnes, Jr. | 705/14 |
| 2008/0036869 A1 | * | 2/2008 | Gustafsson et al. | 348/222.1 |
| 2008/0188203 A1 | * | 8/2008 | Vogedes et al. | 455/412.2 |
| 2008/0204266 A1 | * | 8/2008 | Malmberg et al. | 340/683 |
| 2009/0146848 A1 | * | 6/2009 | Ghassabian | 341/22 |

* cited by examiner

*Primary Examiner* — Tan Trinh
(74) *Attorney, Agent, or Firm* — Hartman & Citrin LLC

(57) ABSTRACT

Systems and methods for providing distinctive vibration alerts are described herein. In different aspects, the methods may include sensing an event and determining a corresponding vibration definition for the event based on one or more properties of the event. The methods also include providing the corresponding vibration definition. The methods then further include producing mechanical vibrations of the device based on the vibration definition.

20 Claims, 2 Drawing Sheets

MOBILE COMMUNICATIONS DEVICE WITH DISTINCTIVE VIBRATION MODES

This application is a continuation of U.S. patent application Ser. No. 11/689,636, filed Mar. 22, 2007, now U.S. Pat. No. 7,801,569, the content of which is hereby incorporated by reference herein in its entirety into this disclosure.

FIELD OF THE DISCLOSURE

The present disclosure relates to systems and methods of communication, and more specifically to systems and methods for providing vibration alerts on communication devices.

BACKGROUND

Generally speaking, there are many times throughout a day when a person cannot be reached face-to-face or via a wired communication device. To make themselves accessible to others and stay current on developments at various times and locations throughout the day, many people presently carry a wireless communication device, such as a cellular telephone or a wireless personal digital assistant (PDA). When an incoming communication reaches a user's wireless communication device, the wireless communication device typically generates an audible alert to inform the user. However, there are many environments where this audible alert may be inappropriate. A classic example is the ringing of a cellular phone during an important business meeting.

Currently, some wireless communication devices provide vibrating alerts for incoming communications. However, to determine if a particular vibration alert is significant, the user typically performs a deliberate action, such as answering a voice call or looking at a data display present on some wireless communication devices. Such actions can take a relatively long time to carry out. Moreover, there are times when such actions may be inappropriate. Therefore, one aspect of the description provided herein provides distinctive vibrating alerts to enable a user to quickly and discreetly differentiate between alerts and determine the significance of incoming communication and communication requests. The description below addresses these and other shortcomings in the present art.

SUMMARY

Systems and methods for providing distinctive vibrating alerts on a device are described herein. In different aspects, the methods may include sensing an event and determining a corresponding vibration definition for the event based on one or more properties of the event. The methods also include providing the corresponding vibration definition. The methods then further include producing mechanical vibrations of the device based on the vibration definition. The sensed event may be one of an incoming communication event, an outgoing communication event, a device event, or an event scheduled by a user.

Wireless communication devices are also described herein. In some embodiments, the devices include one or more data storage medium configured to store a first database of vibration definitions 126 and a second database of one or more vibration configuration files. The device further comprises a vibration element configured to produce mechanical vibrations of the wireless communication device. Moreover, the device also comprises a controller configured to activate the vibration element based on at least one vibration definition and at least one vibration configuration file. In some embodiments, the controller is further configured to sense one or more events, determine a corresponding vibration definition for the event based on one or more properties of the event, and activate the vibration element for each event.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The teachings herein are described with reference to the accompanying figures.

DETAILED DESCRIPTION

It is to be understood that the figures and descriptions of the present disclosure have been simplified to illustrate elements that are relevant for a clear understanding of various embodiments, while eliminating, for purposes of clarity, other elements. For example, a modulator/demodulator, a coder/decoder, and a power source are not described or illustrated herein. Those of ordinary skill in the art will recognize, however, that these and other elements may be desirable. However, because a description of such elements does not facilitate a better understanding of the present disclosure, a discussion of such elements is not provided herein.

Figure 1:
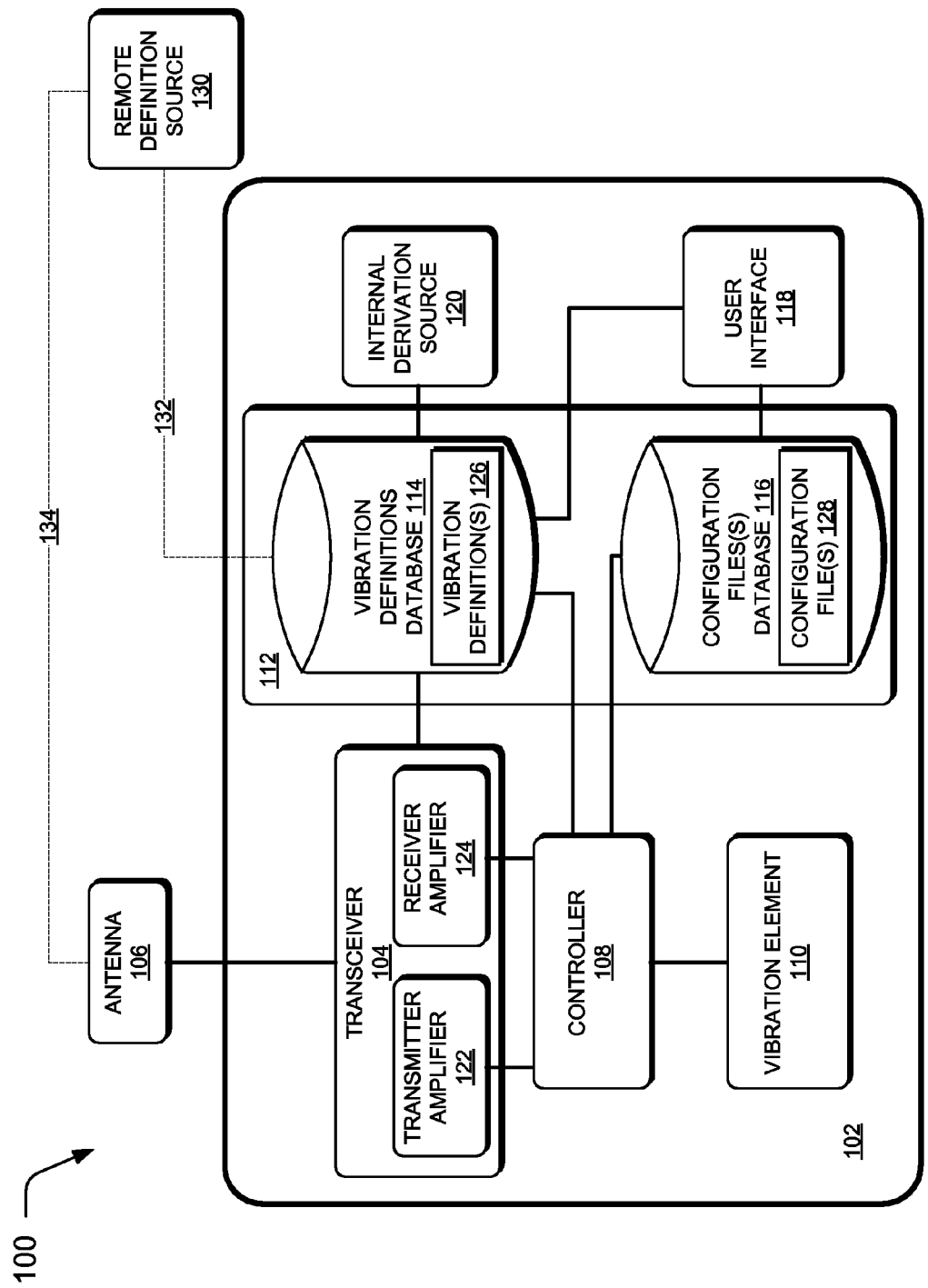
FIG. 1 is a block diagram illustrating various embodiments of a wireless communication device.

FIG. 1 illustrates various embodiments of a wireless communication device 100. According to some embodiments, the wireless communication device 100 may be a wireless telephone. According to other embodiments, the wireless communication device 100 may be a personal digital assistant (PDA), smart phone or equivalent device. In specific embodiments, the wireless communication device 100 may be an Internet-based Voice over Internet Protocol (VoIP) device.

As illustrated in FIG. 1, according to various embodiments, the wireless communication device 100 includes a housing 102. The housing 102 may be fabricated from a solid material that serves to cover internal components of the wireless communication device 100 and protect them from exposure to the elements. The wireless communication device 100 may also include a transceiver 104, an antenna 106, a controller 108, a vibration element 110, a data storage medium 112 that contains a vibration definitions database 114 and a configuration file database 116, a user interface 118, and an internal derivation source 120. The transceiver 104, the controller 108, the vibration element 110, the data storage medium 112, the user interface 118, and the internal derivation source 120 may be connected by a printed circuit board (not shown) positioned within the housing 102.

The transceiver 104 is coupled to the controller 108 and includes a RF transmitter amplifier 122 coupled to the controller 108, an RF receiver amplifier 124 coupled to the controller 108, and the antenna 106 is coupled to the transceiver 104.

According to exemplary embodiments, the controller 108 is coupled to the vibration element 1 10 and is for generating mechanical vibrations of the wireless communication device 100. The controller 108 generates the mechanical vibrations based on vibration definitions 126 in the vibration definitions database 114 and based on one or more configuration files 128 in the configuration file database 116.

Moreover, the controller 108 can sense incoming and outgoing communication events from its coupling to the transceiver 104, and specifically the RF transmitter amplifier 122 and the RF receiver amplifier 124. Accordingly, the controller 108 may activate the vibration element 110 to produce mechanical vibrations of the wireless communication device 100 for communication events. As used herein, communication events include any instances during which an incoming communication is received by the transceiver or an outgoing communication is transmitted by the transceiver. For example, communication events may include an incoming voice call, an incoming data communication, (e.g., incoming email, incoming video message, incoming text message, incoming instant message, incoming indication of availability for voice or data communication, Internet download, incoming Internet web events, incoming Ecommerce events, etc.), and outgoing data communication, (e.g., outgoing email, outgoing video message, outgoing text message, outgoing instant message, outgoing indication of availability for voice or data communication, Internet upload, outgoing Ecommerce events, etc.), as well as any alerts or prompts transmitted or received to facilitate these communications. Nevertheless, one ordinarily skilled in the art will appreciate that in other embodiments of the wireless communication device 100, the controller 108 may activate the vibration element for additional communication events that support the exchange of information.

In some embodiments, the controller 108 is also capable of activating the vibration element 110 for other events, such as device events that impact the condition or the usability of the wireless communication device 100. For example, device events may include, but are not limited to, device low battery, device security problems, device software updates, and device acquiring or losing network service coverage. In other embodiments, these other events may also include events that a user has scheduled the wireless communication device 100 to notify the user of at a future time. For example, these scheduled events may include, but are not limited to, appointments, meetings, deadlines, life events, tasks or to-do lists, and the like. Nevertheless, one ordinarily skilled in the art will readily appreciate that in other embodiments, the controller 108 may be configured to sense other events that occur on the wireless communication device 100 as it performs other functionalities, as well as other events scheduled by a user.

In still other embodiments, where the wireless communication device 100 may be equipped to provide electronic games, the wireless communication device 100 may be configured so that events occurring in the electronic games become device events. For example, when an auto racing game is being played, device events may indicate when a race car being controlled is accelerating, when the race car is going off track, when the race car has collided with another racing vehicle, and the like. However, one ordinarily skilled in the art will readily appreciate device events may be configured to coincide with any number of events that occur in any electronic game.

In additional embodiments, where the wireless communication device 100 may be equipped with navigation capabilities (e.g., a GPS receiver equipped wireless communication device), the wireless communication device 100 may be configured to provide device events that offer navigation guidance and alerts. For example, device events may notice a user of their relative position to some geographical location or boundary, a destination landmark or a person, and the like.

In still more embodiments, the wireless communication device 100 may also implement device events to cover a variety of other scenarios. For example, device events may be implemented to provide notification of important events related to health status, (e.g., reminders to take medication), or provide medical benefits by waking up or stimulating a user. Device events may also be implemented to correlate with time, such as chimes or alarms.

In instances where the wireless communication device 100 may be configured to remotely monitor other devices, such as through WiFi, Bluetooth or other networks, the wireless communication device 100 may be configured so that external events related to those other devices may correspond and trigger device events.

In certain embodiments where the wireless communication device 100 may be configured to automatically receive emergency information, such automated voice calls or text messages related to weather events, accidents, local or area wide disasters, the wireless communication device 100 may be configured to activate device events based on these emergency information transmissions.

In other embodiments, wherein the wireless communication device has text messaging or text storage capabilities, i.e., short messaging service (SMS), the wireless communication device 100 may be configured to produce communication events to represent selected words or phrases. For example, device events may produce unique vibration patterns that correspond to incoming text messages such as "call home", "where are you", and the like. In certain embodiments, device events may be similarly produced for texts stored in the wireless communication device 100. This may provide users with the content of incoming text messages, as well as assist physically impaired individuals, such as deaf individually, by translating information into an understandable form.

In still other embodiments, the controller 108 may be configured to cause vibration element 1 10 to generate vibrations of different intensity. By example, rather than limitation, vibration intensity could vary based on the urgency of an event (e.g., an urgent email may cause vibration elements 110 to generate vibrations that are more intense than for standard emails).

In further embodiments, the wireless communication device 100 may be equipped with additional elements that provide other alerts, i.e., visual light alerts and/or audible alerts in the form of rings or musical tones, and the controller 108 is capable of activating the vibration element 110 in concert or in sequence with these alerts. By example, and not limitation, the controller 108 may activate the vibration element 110 in sync to the beat of a musical tone alert. In additional embodiments, the controller 108 may also serve to control and coordinate other functionalities of the wireless communication device 100. One ordinarily skilled in the art will readily appreciate that in other embodiments, almost all audio or visual alerts produced by a wireless communication device 100 may be replaced with a variable or unique vibration patterns.

According to various embodiments, the vibration definitions database 114 supplies vibration definitions 126 that enable the controller 108 to activate the vibration element 1 10 to produce corresponding mechanical vibrations. The vibration definitions database 114 may be located in the same data storage medium 112 as the configuration file database 116, as illustrated in FIG. 1. However, in other embodiments, the vibration definitions database 114 may be located in a separate data storage medium. According to exemplary embodiments, each vibration definition 126 in the vibration definitions database 114 is configured to enable the production of distinctive mechanical vibration pattern. By way of example, rather than limitation, each vibration definition 126 directs the production of a distinctive vibration pattern by varying elements that include strength, amplitude, frequency, intensity, and durations of the vibrations. Furthermore, the uniqueness of each vibration definition 126 is used to represent useful information to a user of the wireless communication device 100.

According to various embodiments, the vibration definitions database 114 may contain vibration definitions 126 from a variety of sources. According to various embodiments, the user interface 1 18 is operatively linked to the vibration definitions database 114. The user interface 118 may enable a user to manually input one or more vibration definitions 126 into the vibration definitions database 114, or to modify the stored vibration definitions 126. The user interface 1 18 includes any input mechanism that enables the wireless communication device 100 to receive input from the user, and to provide output to the user. For example, the user interface 118 may include, but is not limited to, combinations of one or more of keyboards, keypads, mouse devices, display screens, touch screens, speakers, microphones, speech recognition packages, and the like. In certain specific embodiments, the user interface 118 may be equipped with a shake sensor (not shown) that enables the user to create vibration definitions 126 by manually shaking or tapping the wireless communication device 100.

According to various embodiments, the internal derivation source 120 is operatively linked to the vibration definitions database 114. In some embodiments, the internal derivation source 120 may be a data storage medium that contains data sources, as well as hardware and software that allows the vibration definitions database 114 to derive vibration definitions 126 from these data sources. For example, these data sources can include music files, video files, audio-video files, mathematical equations, and telephone directory of number, names and call times. In other words, internal derivation source 120 contains data sources that enable the wireless communication device 100 to generate vibration definitions 126 based on the characteristics of preexisting data compilations. One ordinarily skilled in the art will appreciate that in other embodiments, the internal derivation source 120 may also include other compilations of data stored in the wireless communication device 100 that possess sufficiently distinctive characteristics to allow the creation of vibration definitions 126. In some embodiments, the internal derivation source 120 is also configured to be updated with additional data compilations via appropriate hardware and software.

According to various embodiments, a remote definition source 130 is operatively linked to the vibration definitions database 114. The remote definition source 130 is used to supply the vibration definitions database 114 with vibration definitions 126. In some embodiments, the remote definition source 130 is linked to the vibration definitions database 114 by a connection 132, which may be wired or wireless. The connection 132 is supported by appropriate hardware and software that enable the transfer of the vibration definitions 126 from the remote definition source 130 to the vibration definitions database 1 14. In some embodiments, the wired connection 132 includes a data network, such as a circuit-switched Advanced Intelligent Network (AIN), a packet-based network, e.g., Internet Protocol (IP) network, and the like. In other embodiments, the wired connection 132 includes a direct 110 connection, such as a SCSI connection, a serial connection, a USB connection, and the like. In further embodiments, the connection 132 is a wireless connection that allows the transfer of data. For example, the wireless connection may include, but is not limited to, a wireless RF connection (e.g. cellular, PCS, WiFi, Ultrawideband, Bluetooth, satellite transmissions), or an infrared connection, and the like. Moreover, in particular embodiments, the remote definition source 130 is linked to the vibration definitions database 114 by a RF connection 134 via the antenna 106 and the transceiver 104.

In some embodiments, these physical and wireless connections, 128 and 130, may be configured to enable the delivery of vibration definitions 126 in near real-time, sometimes at the same time as other information. By example, but not limitation, a distinctive vibration definition 126 may be delivered in combination with an incoming text message, and the vibration definition 126 may then be immediately used by the controller 108 to activate the vibration element 110 to alert a user of the accompanying incoming message. Similarly, in other embodiments, vibration definitions 126 may be sent along with other information (e.g., email or other events), or they may be associated with vibrations definitions already resident in the communication device 100, or vibration definitions 126 generated by a function sent in an incoming data transmission.

According to various embodiments, the configuration file database 116 supplies a configuration file 128 that defines the specific vibration definition 126 that the controller 108 uses to activate the vibration element 110 to produce corresponding mechanical vibrations. The configuration file database 116 may be located in the same data storage medium 112 as the vibration definitions database 114, as illustrated in FIG. 1. However, in other embodiments, the configuration file database 116 may be located in a separate data storage medium. In further embodiments, the configuration file database 116 may contain a plurality of configuration files 128 that define the specific vibration definition 126 the controller 108 uses to activate the vibration element 110.

The configuration file 128 determines the particular distinctive vibration definition 126 to be applied to a particular event sensed by the controller 108. Specifically, the configuration file 128 differentiates events based on the properties of each event. In this way, distinctive vibrations can be applied to the differentiate events. This allows a user to easily recognize or screen events based on distinct vibrations of the wireless communication device 100.

In some embodiments, the configuration file 128 may distinguish the events based on properties such as event origin, event type, event subtype, or importance of the event. For example, in some embodiments, the configuration file 128 may assign a distinctive vibration definition 126 for communication events originating from a certain person or a specific phone number, regardless of the type of the communication event (e.g., phone calls, text messages and instant messages). Likewise, in further embodiments, a distinctive vibration definition 126 may also be assigned to communication events originating from a certain group of people or phone numbers.

In some embodiments, the configuration file 128 may assign vibration definitions 126 by type. For example, the configuration file 128 may assign a first vibration definition for all events that are of the "communication event" type, a second vibration definition for all events that are of the "device event" type, and a third vibration definition for all events of the "scheduled event" type.

In other embodiments, the configuration file 128 may assign a vibration definition 126 for each subtype within a type of event. For example, a distinctive vibration definition may be assigned to each subtype event in "scheduled events", such as one for appointments, one for meetings, one for deadlines, one for life events, one for tasks or to-do lists, and the like. Likewise, a distinctive vibration definition may be assigned to each subtype event in "device events," such as one for device low battery status, one for device security problems, one for software updates.

Nevertheless, in still other embodiments, a distinctive vibration may also be assigned by the configuration file 128 to a particular event, or a particular kind of events. For example, a distinctive vibration 126 may be assigned for a particular upcoming business meeting, or for a particular kind of business meetings (e.g., weekly business meeting), respectively. In further embodiments, priority communication events, regardless of whether it is an incoming email, incoming video message, incoming text message, incoming instant message, etc., may be assigned the same distinctive vibration definition 126 by the configuration file 128. The assigned distinctive vibration definition 126 allows the user to recognize the importance of the communication event. In some embodiments, a user has the ability to selectively designate any event or events as important or significant, and assign distinctive vibration definitions 126 to the event or events so that the user is informed of each occurrence.

In additional embodiments, the configuration file 128 may designate a vibration definition 126 for an event based simultaneously on two or more properties of the event. For example, for four communication events of same subtype, such as four voice calls, one of the voice calls may be assigned a first distinctive vibration definition associated with general voice calls (subtype). The second voice call may be assigned a second distinctive vibration definition because it has been designated by the user as important (importance). The third voice call may be assigned a third distinctive vibration definition because it came from a phone number designated as a special source (origin). The last voice call, which is from another specific number that is also designated as a special source, will nevertheless be assigned yet a fourth vibration definition because the user has also designated the call as important (origin and importance).

One ordinarily skilled in the art will readily appreciate that in other embodiments, distinctive vibration definitions 126 may also be applied to one or more events based on additional properties of each event, so long as these additional properties of each event serve to distinguish the event from at least one other event, and the assignment of the distinctive vibration definition 126 conveys the desired information regarding the one or more events to the user. Moreover, distinctive vibration definitions 126 may be assigned to other events that occur on a wireless communication device 100 as a result of other functionalities.

According to the various embodiments, the configuration files database 116 is operatively linked to the user interface 118. The user interface 118 may be used by a user to manually input one or more configuration files 128 into the configuration file database 116 or to modify the stored configuration files 128.

According to the various embodiments, the user interface 118 may also be used to control the intensity of the vibrations or frequency of the vibrations in a manner similar to a volume control for audio output.

According to the various embodiments, the vibration element 110 produces mechanical vibrations of the wireless communication device 100. In some embodiments, the vibration element 110 generates mechanical force to produce the mechanical vibrations. In other embodiments, the vibration element 110 that produces the vibrations of the wireless communication device 100 is a subwoofer. In additional embodiments, a plurality of vibration elements 110 may be used to produce mechanical vibrations of the wireless communication device 100. In other embodiments, the one or more vibration elements 110 may employ a combination of mechanical force and sound generated by the subwoofer to produce vibrations.

Figure 2:
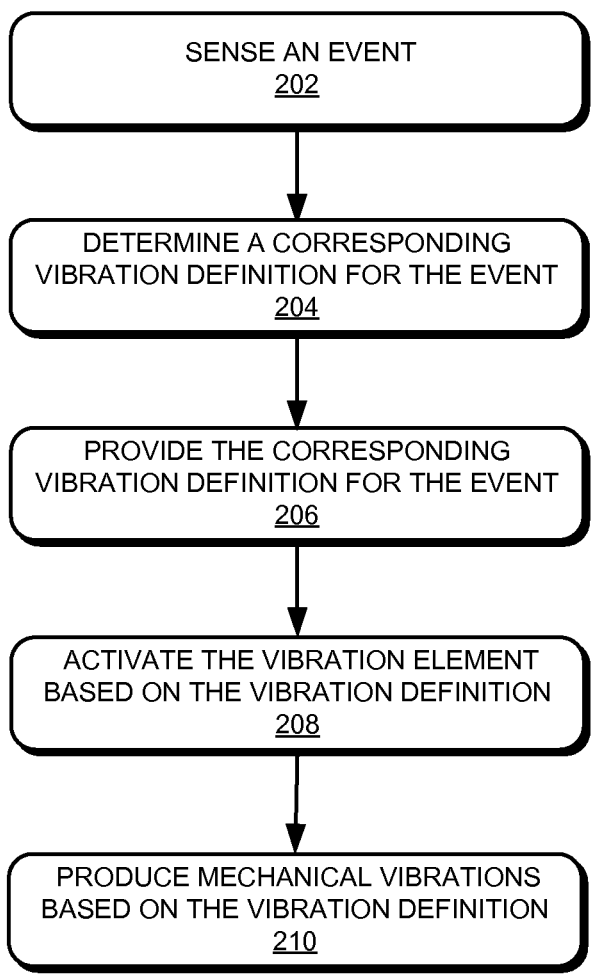
FIG. 2 is a flow chart illustrating various embodiments of a process flow for providing a vibration pattern for an event on some embodiments of the wireless communication device.

FIG. 2 illustrates various embodiments of a process flow 200 for providing a vibration pattern for an event on some embodiments of the wireless communication device 100. The process begins at block 202, which represents sensing the event. In some implementations, block 202 may represent a controller (e.g., at 108 in FIG. 1) sensing the event. The event may be a communication event, a device event, or a scheduled event.

Block 204 represents determining a corresponding vibration definition 126 for the event based on the configuration file 128. In some implementations, block 204 may represent the controller 108 determining the corresponding vibration definition 126. The configuration file 128 assigns distinctive vibration definitions 126 to events based on one or more properties of each event.

As described above, if the event is a communication event, the configuration file 128 may assign a distinctive vibration based on the fact that it is a communication event (type), subtype (e.g., voice call, text message, email, Internet download, etc.), origin (e.g., from a specific person or number), and/or importance (as designated by a user). Likewise, if the event is a device event, the configuration file 128 may assign a distinct vibration based on the fact that it is a device event (type), subtype, (e.g., low battery alert, security problem alert, software update alert, etc.), and/or importance (as designated by the user). Moreover, if the event is a scheduled event, the configuration file 128 may assign a distinctive vibration based on the fact that it is a scheduled event (type), subtype (e.g., meeting, appointment, tasks, etc.), and/or importance (as designated by a user).

However, one ordinarily skilled in the art will readily appreciate that in other embodiments, distinctive vibration definitions 126 may be assigned to other events that occur on a wireless communication device 100 as a result of other functionalities, using one or more properties of each event.

Once the controller 108, for example, has determined a corresponding vibration definition 126 for the event, the process proceeds to block 206, which represents providing the corresponding vibration definition 126 for the event. In some implementations, block 206 may represent the vibration definitions database 114 providing the corresponding vibration definition 126 for the event to the controller 108.

Block 208 represents activating the vibration element based on the vibration definition 126. In some implementations, the controller may perform block 208.

Block 210 represents producing mechanical vibrations based on the vibration definition 126. In some implementations, the activated vibration element (e.g., vibration element 110 in FIG. 1) may perform block 210.

While several embodiments have been disclosed and described, it should be apparent, however, that various modifications, alterations and adaptations to those embodiments may occur to persons ordinarily skilled in the art with attainment of some or all of the advantages. For example, according to various embodiments, some of the transceiver 104, the antenna 106, the controller 108, the vibration element 110, the data storage medium 112 containing the vibration definitions database 114 and the configuration file database 1 16, and the user interface 118 can comprise portions in other devices, or function as add-on accessories to other devices.

Such devices can include pagers, cordless telephones, portable video devices, cameras, automobiles, seats, headphones, clothing, jewelry, watches, music players, navigation devices, health monitoring devices, weather radios, gamer controllers, security devices, and other portable electronic devices. For such embodiments, the controller 108 activates the vibration element 110 to generate mechanical vibrations in the device based on the vibration definitions 126 and one or more configuration files 128, and the one or more configuration files 128 determines each specific events to apply the one of the vibration definitions 126. It is therefore intended that all such modifications, alterations and adaptations are covered without departing from the scope and spirit of the present disclosure as defined by the appended claims.

What is claimed is:

1. A wireless communication device, comprising:
   a controller; and
   a vibration element coupled to the controller, the vibration element generating a distinct mechanical vibration, the distinct mechanical vibration being applied to a communication event sensed by the controller, the communication event being an incoming data communication;
   wherein the incoming data communication is a text message and the distinct mechanical vibration represents a selected word or a phrase from the text message.

2. The wireless communication device of claim 1, further comprising an internal derivation source operatively linked to a vibration definitions database, the internal derivation source containing a data source, a hardware, and a logic allowing the vibration definitions database to generate the distinct mechanical vibration based on a characteristic of a pre-existing data compilation on the data source.

3. The wireless communication device of claim 2, wherein the data source includes at least one of a music file, a video file, an audio-video file, and a mathematical equation.

4. The wireless communication device of claim 2, wherein the vibration definitions database and a configuration file database are located on a data storage medium.

5. The wireless communication device of claim 4, wherein the configuration file database supplies a configuration file to the controller, the configuration file being used to differentiate between different communication events based on a plurality of properties associated with each communication event.

6. The wireless communication device of claim 5, wherein the plurality of properties includes at least one of a communication event origin, a communication event type, or a communication event subtype.

7. The wireless communication device of claim 1, further comprising a transceiver, the transceiver including a radio frequency transmitter amplifier coupled to the controller and a radio frequency receiver amplifier coupled to the controller.

8. The wireless communication device of claim 1, wherein the vibration element generates differing intensities for the distinct mechanical vibration.

9. The wireless communication device of claim 8, wherein the intensities vary based upon an urgency of the communication event.

10. The wireless communication device of claim 1, wherein the distinct mechanical vibration is created by varying at least one of a vibration strength, a vibration amplitude, a vibration frequency, a vibration intensity, or a vibration duration.

11. The wireless communication device of claim 1, wherein a configuration file database supplies a configuration file to the controller, the configuration file used in distinguishing the communication event based on at least one of a communication event origin, a communication event type, a communication event subtype, or an importance of the communication event.

12. The wireless communication device of claim 11, further comprising a user interface operatively linked to the configuration file database, the user interface used in modifying the configuration file.

13. A system, comprising:
   a network; and
   a remote data storage medium on the network, the remote data storage medium containing a vibration definitions database, the vibration definitions database supplying a vibration definition to a controller of a wireless communication device for activating a vibration element of the wireless communication device, the vibration element generating a distinct mechanical vibration, the distinct mechanical vibration being applied to a communication event sensed by the controller, the communication event being an incoming data communication;
   wherein the incoming data communication is a text message and the distinct mechanical vibration represents a selected word or a phrase from the text message.

14. The system of claim 13, wherein the network connects a remote definition source to the vibration definitions database using at least one of a data connection, a wireless RF connection, or an infrared connection.

15. The system of claim 13, wherein the vibration definition is sent to the wireless communication device in combination with the incoming data communication.

16. The system of claim 13, further comprising an internal derivation source operatively linked to the vibration definitions database, the internal derivation source containing a data source, a hardware, and a logic allowing the vibration definitions database to generate the distinct mechanical vibration based on a characteristic of a pre-existing data compilation on the data source.

17. A method, comprising:
   generating a distinct mechanical vibration using a vibration element of a wireless communication device, the distinct mechanical vibration being applied to a communication event sensed by a controller of the wireless communication device, the communication event being an incoming data communication;
   wherein the incoming data communication is a text message and the distinct mechanical vibration represents a selected word or a phrase from the text message; and
   wherein the vibration element is activated by the controller to generate the distinct mechanical vibration.

18. The method of claim 17, wherein the controller is supplied with a vibration definition, the vibration definition being provided by a remote data storage medium containing a vibration definitions database.

19. The method of claim 18, wherein an internal derivation source operatively linked to the vibration definitions database generates the distinct mechanical vibration based on a characteristic of a pre-existing data compilation on a data source of the internal derivation source.

20. The method of claim 17, wherein the vibration element is a subwoofer.

* * * * *